United States Patent

[11] 3,624,159

[72] Inventor Michael J. Dagani
 Baton Rouge, La.
[21] Appl. No. 815,281
[22] Filed Apr. 9, 1969
[45] Patented Nov. 30, 1971
[73] Assignee Ethyl Corporation
 New York, N.Y.

[54] PRODUCTION OF ORGANIC HALIDES AND TERTIARY PHOSPHINE SULFIDES
 8 Claims, No Drawings
[52] U.S. Cl. .................................................. 260/606.5 P,
 260/652 R
[51] Int. Cl. ..................................................... C07f 9/50,
 C07f 19/02
[50] Field of Search ......................................... 260/606.5 P

[56] References Cited
OTHER REFERENCES

Houben– Weyl (I), Methoden Der Organischen Chemie, Vol. 1, (1963), p. 203, QD258H7
Houben– Weyl (II), Methoden Der Organischen Chemie, Vol. 1, (1963), p. 213, QD258H7
Houben– Weyl (III), Methoden Der Organischen Chemie, Vol. 1, (1963), p. 171, QD258H7

Primary Examiner—Tobias E. Levow
Assistant Examiner—Werten F. W. Bellamy
Attorney—Donald L. Johnson ABSTRACT: Organic halides and tertiary phosphine sulfides are coproduced by heating a thiol (e.g., alkane monothiol, alkane dithiol) with a tertiary phosphine dihalide to a suitably elevated temperature.

PRODUCTION OF ORGANIC HALIDES AND TERTIARY PHOSPHINE SULFIDES

This invention relates to, and has as its principal object, the provision of a process wherein an organic halide and a tertiary phosphine sulfide may be coproduced. It appears that prior to this invention no known process accomplished this result.

In accordance with this invention aliphatic or cycloaliphatic organic halides and tertiary phosphine sulfides are coproduced by heating an aliphatic or cycloaliphatic thiol with:

a. A tertiary phosphine (e.g., a trihydrocarbyl phosphine) in admixture with a carbon tetrahalide; or a tertiary phosphine dihalide (e.g., a trihydrocarbyl phosphine dihalide).

In either case the reaction is conducted at an elevated temperature at which the organic halide and tertiary phosphine sulfide products are formed.

When utilizing a tertiary phosphine dihalide as the phosphorus-containing reagent in the process, the reaction proceeds in accordance with the equation:

$$R_3PX_2 + R'SH \rightarrow X + HX + R_3P=S$$

(R = alkyl, cycloalkyl, aryl, aralkyl, alkenyl, etc.; R'= alkyl, cycloalkyl, aralkyl, alkenyl, etc., X = Cl, Br or I)

The tertiary phosphine dihalide may be readily prepared in situ by an addition reaction between equivalent amounts of tertiary phosphine and elemental halogen:

$$R_3P + X_2 \rightleftharpoons 3PX_2$$

When the phosphorus-containing reactant of the process is a tertiary phosphine used in the presence of a carbon tetrahalide, it appears that an ionic intermediate is formed and that this intermediate actually participates in the reaction with the thiol. Thus, the reaction may be depicted as follows:

$$R_3P + CX_4 \rightarrow 3PX)^+(CX_3)^-$$

$$(R_3PX)^+(CX_3)^- + R'SH \rightarrow X + CHX_3 + R_3P=S \quad (II)$$

Reactions (I) and (II) as depicted above involve use of a reactant containing only one sulfhydryl group (e.g., an alkane monothiol). When the thiol reactant contains more than one sulfhydryl group (e.g., alkane dithiol, alkane trithiol) the amount of the phosphorus-containing reactant consumed in the process will usually be correspondingly increased. For example, two moles of $R_3PX_2$ will be consumed in a complete reaction with one mole of an alkane dithiol.

Tertiary phosphine dihalides which may be used in the process include triethyl phosphine dichloride, tripropyl phosphine dibromide, trioctyl phosphine diiodide, tridecyl phosphine dibromide, tricyclohexyl phosphine dichloride, triphenyl phosphine diiodide, tribenzyl phosphine dibromide, tris-2,3-dichloropropyl phosphine dichloride, triphenethyl phosphine dibromide, tritolyl phosphine dichloride, tri-2-chloroethyl phosphine dichloride, tris-dibromophenyl phosphine dibromide, and the like. In general, each organic group may contain up to about 18 carbon atoms and may contain inert substituents (i.e., substituents which do not interfere with the desired reaction; nitro groups, alkoxy groups, trihydrocarbyl silyl groups, halogen atoms, etc., serving as examples). The preferred tertiary phosphine dihalides are the dibromides and the dichlorides, especially triaryl phosphine dibromides and dichlorides.

Exemplary tertiary phosphines which may be used in conjunction with carbon tetrahalide are such compounds as trimethyl phosphine, tributyl phosphine, trioctadecyl phosphine, tris-methylcyclohexyl phosphine, triphenyl phosphine, tricumenyl phosphine, tricrotenyl phosphine, tri-p-chlorobenzyl phosphine, and the like. The organic groups may carry inert substituents, such as those noted above. The preferred carbon tetrahalides used therewith are carbon tetrachloride and carbon tetrabromide, although carbon tetraiodide may be used if desired.

Thiols suitable for use in the process of this invention are exemplified by ethane thiol, 1-propane thiol, 2-propane thiol, 1-butane thiol, 1-pentane thiol, 1-hexane thiol, 1-heptane thiol, 1-tetradecane thiol, 1,2-ethane dithiol, 1,2-propane dithiol, 1,3-propane dithiol, 1,4-butane dithiol, 1,6-hexane dithiol, 2-phenyl-1-ethane thiol, cyclohexane thiol, and the like. These reactants will generally contain no more that about 24 carbon atoms in the molecule although in special cases the compound may be a still higher molecular weight mercaptan. The prime requirement of the thiol reactants is that they contain at least one sulfhydryl or mercapto group attached to an aliphatic or cycloaliphatic carbon atom and that any other substituents in the molecule are inert in the sense they will not interfere with the desired reaction. Thus, the thiol reactant may contain one or more inert substituents such as halogen substitution, an ester group, a nitro group, an aryl group, an amino group, the nitrile group, the amide function, or the like. Also, the thiol reactant may be a heterocyclic compound. Thus, the process of this invention may be applied, for example, to esters or amides of such mercapto acids as thioglycolic acid, cysteine, β-thiolvaline, thiolhistidine, and the like. Compounds in which a thiol group is attached to a primary carbon atom are generally highly reactive and give good yields in the process.

The reaction is normally conducted at a temperature within the range of about 70° to about 200° C., the lower temperatures of this range often being convenient when operating at reduced pressures. It appears that during the course of the reaction between a tertiary phosphine dihalide and a thiol, a phosphonium halide salt $(R_3PSR)^+(X)^-$ is produced as an intermediate. This intermediate, in turn, is thermally disproportionated into the organic halide and tertiary phosphine sulfide via direct displacement by halide ion. Thus, when practicing this process one may find it desirable to adjust the conditions so as to deliberately produce the phosphonium halide intermediate and at some later stage apply sufficient thermal energy to the system in order to release the desired end products.

The reactions between the tertiary phosphine dihalides and the aliphatic and cycloaliphatic thiols are preferably conducted in an inert reaction solvent. Nitrile reaction media are particularly suitable for this purpose. However, a variety of other materials are suitable for use. Thus, exemplary solvents or diluents in which this reaction may be effected include acetonitrile, propionitrile, butyronitrile, capronitrile, benzonitrile, chlorobenzene, 1-methyl-2-pyrrolidone, dimethyl formamide, decane, tetradecane, eicosane, xylene, mesitylene, ethyl benzene, methyl naphthalene, cyclohexane, and the like. Solvents of this character may also be used with the tertiary phosphine/carbon tetrahalide reactants described above.

In order to still further appreciate the practice and advantages of this invention, reference should be had to the following illustrative examples.

EXAMPLE I $$(C_6H_5)_3PBr_2 + n-C_{10}H_{21}SH \rightarrow C_{10}H_{21}Br + (C_6H_5)_3P=S + HBr$$

A solution containing 0.010 mole of triphenyl phosphine and 10 of dry acetonitrile was cooled to 0° C. Bromine (0.010 mole) was added to the well stirred mixture over a 15–20 minute period, and then 1-decane thiol (0.010 mole) was added in one portion. The flask was arranged for distillation and when acetonitrile started to distill (bp. 81° C.) hydrogen bromide evolution began. After most of the solvent was distilled, distillation was continued at 30 mm. of mercury pressure. The product, 1-bromodecane was collected at 138°–139° C. (30 mm. Hg.). The distillate was dissolved in ether and washed twice with water and once with saturated sodium bicarbonate to remove solvent and hydrogen bromide. After drying over calcium sulfate, ether was removed by distillation; the last traces of ether were removed by pumping at 10 mm. for one minute. The distillate product weighed 0.98 g. (44 percent yield) and had physical constants and infrared spectrum identical to 1-bromodecane.

EXAMPLE II

Example I was repeated using 0.0575 mole of each reagent and 60 ml. of acetonitrile. After distillation and work-up, 9.65 g. (76 percent yield) of 1-bromodecane was obtained.

EXAMPLE III $$(C_6H_5)_3PBr_2 + n-C_6H_{13}SH \rightarrow n-C_6H_{13}Br + (C_6H_5)_3P-S + HBr$$

To triphenyl phosphine dibromide (0.0575 mole) in 50 ml. of acetonitrile was added 1-hexane thiol (0.0534 mole) at about 15° C. Distillation at atmospheric pressure afforded 5.40 g. (61 percent yield) of 1-bromohexane, bp. 153°–154° C. The distillate product was identical in all respects to 1-bromohexane.

EXAMPLE IV $2(C_6H_5)_3PBr_2 HSCH_2CH_2SH \rightarrow BrCH_2CH_2Br + 2(C_6H_5)_3P=S + 2HBr$ To 0.0426 mole of triphenyl phosphine dibromide in 100 ml. of acetonitrile was added 0.0202 mole of 1,2-ethane dithiol and 0.7915 g. of undecane (internal standard). Distillation at 30 mm. of mercury pressure with the receiver immersed in Dry Ice-acetone followed by the usual workup (see example I) afforded 2.44 g. (64 percent yield) of 1,2-dibromoethane by vapor phase chromatography analysis.

EXAMPLE V $(C_6H_5)_3P + CCl_4 n-C_6H_{13}SH \rightarrow n-C_6H_{13}Cl + (C_6H_5)_3P=S + CHCl_3$ To a solution of 0.010 mole of 1-hexane thiol in 20 ml. of carbon tetrachloride was added 0.010 mole of triphenyl phosphine with stirring at 0° C. The reaction mixture was heated at 80 C. for two hours and then distilled. After most of the chloroform and carbon tetrachloride had distilled, the product was distilled at 30 mm. of mercury pressure into a cooled (Dry Ice-acetone) receiver. Vpc analysis indicated chloroform, carbon tetrachloride and 1chlorohexane to be present. Solvent was removed by pumping at 10 mm. for a couple of minutes to afford 0.80 g. (67 percent yield) of product that was identical in all respects with 1-chlorohexane

EXAMPLE VI $(C_6H_5)_3P + CCl_4 C_6H_{11}SH \rightarrow C_6H_{11}Cl + (C_6H_5)_3P=S + CHCl_3$ Example V was repeated using 0.049 mole of cyclohexane thiol, 50 ml. of carbon tetrachloride and 0.050 mole of triphenyl phosphine. After distillation and workup, the product was analyzed by vapor phase chromatography. Chlorocyclohexane was present (5 percent yield) along with unreacted cyclohexane thiol.

EXAMPLE VII $(C_6H_5)_3HPBr_2 + C_6H_{11}SH \rightarrow C_6H_{11}Br + (C_6H_5)_3P=S + HBr$ Example IV was repeated with 0.049 mole of cyclohexane thiol. Distillation and workup afforded 4.07 g. (51 percent yield) of bromocyclohexane, identical in all respects with an authentic sample.

In the foregoing examples the residues remaining after alkyl halide distillation were triturated with ether and pentane. In each case crystallization from absolute ethanol resulted in white needles of triphenyl phosphine sulfide, m.p. 161°–162° C. [reported m.p. 160.5°–161° C. --see Davis, J. Org. Chem., 23, 1765 (1958)]. The infrared and NMR spectra were identical to the published spectra of triphenyl phosphine sulfide.

The coproducts produced by the process of this invention have various utilities. For example, the tertiary phosphine sulfides are useful as additives for antiknock fluids and leaded gasolines--see U.S. Pat. No. 1,866,695. As is well known, organic halides are used as intermediates for the synthesis of a variety of end products.

I claim:

1. A process of coproducing organic halide and tertiary phosphine sulfide which comprises heating an aliphatic or cycloaliphatic thiol with a tertiary phosphine dihalide having the formula:

$$R_3PX_2$$

wherein R is alkyl, cycloalkyl or aryl and wherein X is chlorine, bromine or iodine to an elevated temperature at which said coproducts are formed.

2. The process of claim 1 wherein the thiol is heated with the tertiary phosphine dihalide in an inert reaction solvent.

3. The process of claim 1 wherein the thiol is heated with the tertiary phosphine dihalide in a nitrile reaction medium.

4. The process of claim 1 wherein said tertiary phosphine dihalide is a tertiary phosphine dichloride or a tertiary phosphine dibromide.

5. The process of claim 1 wherein triaryl phosphine dichloride or triaryl phosphine dibromide is employed.

6. The process of claim 1 wherein the thiol is characterized by having a sulfhydryl group attached to a primary carbon atom.

7. The process of claim 1 wherein the thiol is an alkane monothiol or an alkane dithiol.

8. The process of claim 1 wherein the thiol is characterized by having a sulfhydryl group attached to a primary carbon atom and the thiol is an alkane monothiol or an alkane dithiol.

* * * * *

PO-1050
(5/69)

UNITED STATES PATENT OFFICE
CERTIFICATE OF CORRECTION

Patent No. 3,624,159    Dated  November 30, 1971

Inventor(s)  Michael J. Dagani

It is certified that error appears in the above-identified patent and that said Letters Patent are hereby corrected as shown below:

Column 1, line 21, reads "$R_3PX_2 azR'SH \rightarrow X+HX+R_3P=S$", should read -- $R_3PX_2 + R'SH \rightarrow R'X + HX + R_3P=S$ -- . Column 1, line 27, reads "$R_3P + X_2 \rightarrow 3PX_2$", should read -- $R_3P + X_2 \rightarrow R_3PX_2$ -- . Column 1, line 33, reads "$R_3P + CX_4 \rightarrow 3PX)^+(CX_3)^-$", should read -- $R_3P + CX_4 \rightarrow (R_3PX)^+(CX_3)^-$ -- . Column 1, line 34, reads "$(R_3PX)^+(CX_3)^- + R'SH \rightarrow X+CHX_3+R_3P=S$ (II)", should read -- $(R_3PX)^+(CX_3)^- + R'SH \rightarrow R'X+CHX_3+R_3P=S$ (II) -- . Column 2, line 1, reads "that", should read -- than -- . Column 2, line 49, reads "$(C_6H_5)_3PBr_2+n-C_{10}H_{21}SH \rightarrow C_{10}H_{21}Br+(C_6H_5)_3P=S+HBr$", should read -- $(C_6H_5)_3PBr_2+n-C_{10}H_{21}SH \rightarrow n-C_{10}H_{21}Br+(C_6H_5)_3P=S+HBr$ -- . Column 2, line 51, reads "10", should read -- 10 ml -- . Column 2, line 75, reads "$C_6H_5)_3PBr_2+n-C_6H_{13}SH \rightarrow n-C_6H_{13}Br+(C_6H_5)_3P-S+HBr$", should read -- $(C_6H_5)_3PBr_2+n-C_6H_{13}SH \rightarrow n-C_6H_{13}Br+(C_6H_5)_3P=S+HBr$ -- . Column 3, line 10, reads "$2(C_6H_5)_3PBr_2HSCH_2CH_2SH \rightarrow BrCH_2CH_2Br+2(C_6H_5)_3P=S+2HBr$", should read -- $2(C_6H_5)_3PBr_2+HSCH_2CH_2SH \rightarrow BrCH_2CH_2Br+2(C_6H_5)_3P=S+2HBr$ -- . Column 3, line 21, reads "$(CH_6H_5)_3P+CCl_4 n-C_6H_{13}SH \rightarrow n-C_6H_{13}Cl+(C_6H_5)_3P=S+CHCl_3$", should read -- $(C_6H_5)_3P+CCl_4+n-C_6H_{13}SH \rightarrow n-C_6H_{13}Cl+(C_6H_5)_3P=S+CHCl_3$ -- . Column 3, line 26, reads "80 C", should read -- 80°C -- . Column 3, line 31, reads "1 chlorohexane", should read -- 1-chlorohexane -- . Column 3, line 37, reads "$(C_6H_5)_3P+CCl_4 C_6H_{11}SH \rightarrow C_6H_{11}Cl+(C_6H_5)_3P=S+CHCl_3$", should read -- $(C_6H_5)_3P+CCl_4+C_6H_{11}SH \rightarrow C_6H_{11}Cl+(C_6H_5)_3P=S+CHCl_3$ -- . Column 4, line 1, reads "$(C_6H_5)_3HPBr_2+C_6H_{11}SH \rightarrow C_6H_{11}Br+(C_6H_5)_3P=S+HBr$", should read -- $(C_6H_5)_3PBr_2+C_6H_{11}SH \rightarrow C_6H_{11}Br+(C_6H_5)_3P=S+HBr$ -- . Column 4, line 16, reads "1,866,695", should read -- 2,866,695 -- .

Signed and sealed this 15th day of May 1973.

(SEAL)
Attest:

EDWARD M. FLETCHER, JR.
Attesting Officer

ROBERT GOTTSCHALK
Commissioner of Patents